United States Patent [19]
Morsch

[11] Patent Number: 5,941,664
[45] Date of Patent: Aug. 24, 1999

[54] TOOLHOLDER HAVING IMPELLER-TYPE COOLANT INDUCER

[75] Inventor: Gary L. Morsch, Dayton, Minn.

[73] Assignee: Kennametal Inc., Latrobe, Pa.

[21] Appl. No.: 08/923,180

[22] Filed: Sep. 4, 1997

[51] Int. Cl.[6] .................................................. B23C 9/00
[52] U.S. Cl. .............................. 409/131; 408/57; 408/59; 409/136
[58] Field of Search .................................. 409/131, 135, 409/136; 408/1 R, 56, 57, 59

[56] References Cited

U.S. PATENT DOCUMENTS

| | | | |
|---|---|---|---|
| 2,478,846 | 8/1949 | Smith | 125/20 |
| 3,153,885 | 10/1964 | Keller et al. | 51/267 |
| 3,364,800 | 1/1968 | Benjamin et al. | 77/68 |
| 4,178,818 | 12/1979 | Yascheritsyn et al. | |
| 4,320,999 | 3/1982 | Briese | 409/136 |
| 4,322,189 | 3/1982 | Briese | 409/136 |
| 4,541,758 | 9/1985 | Frank et al. | 408/1 B |
| 4,570,952 | 2/1986 | Heimbigner et al. | 297/20 |
| 4,621,547 | 11/1986 | Yankoff | 82/1 C |
| 4,693,642 | 9/1987 | Mair et al. | 408/59 |
| 4,705,439 | 11/1987 | Hoyle et al. | 409/136 |
| 4,795,292 | 1/1989 | Dye | 409/136 |
| 4,850,755 | 7/1989 | Spencer | 408/56 |
| 4,865,495 | 9/1989 | Hinds | 408/56 |
| 4,964,764 | 10/1990 | Perrotto | 409/136 |
| 5,183,363 | 2/1993 | Reiterman et al. | 408/59 |
| 5,290,130 | 3/1994 | Beretta | 409/131 |
| 5,580,197 | 12/1996 | Rohm | 408/240 |
| 5,590,985 | 1/1997 | Mack | 408/56 |
| 5,674,032 | 10/1997 | Slocum et al. | |
| 5,772,367 | 6/1998 | Daniel | 408/56 |

FOREIGN PATENT DOCUMENTS

| | | |
|---|---|---|
| 543024 | 10/1922 | France. |
| 133433 | 5/1931 | Germany. |
| 3819799 | 2/1989 | Germany. |
| 05309539 | 11/1993 | Japan. |

OTHER PUBLICATIONS

Patent Abstracts of Japan, vol. 097, No. 007, Jul. 31, 1997, & JP 09 057573 A (Ueda Shuji; Nisshin Koki KK), Mar. 4, 1997.

Patent Abstracts of Japan, vol. 097, No. 006, Jun. 30, 1997, & JP 09 029529 A (Sumitomo Electric Ind Ltd), Feb. 4, 1997.

Copy of International Search Report, mailed Dec. 3, 1998, in Application No. PCT/US98/17021, filed Aug. 17, 1998.

*Primary Examiner*—Andrea L. Pitts
*Assistant Examiner*—Christopher Kirkman
*Attorney, Agent, or Firm*—John M. Vasuta

[57] ABSTRACT

A toolholder is provided for receiving, pressurizing, and conducting an external stream of coolant to a rotating cutting tool without mechanical containment between the toolholder and the coolant stream. The toolholder includes a shank attachably connectable to a rotatable drive shaft, an adapter, such as a collet chuck, for connecting a rotatable cutting tool to the shank, and a coolant inducer mounted between the shank and the adapter. The coolant inducer is formed from an impeller assembly having a plurality of uniformly spaced, coolant receiving openings around its periphery for receiving an uncontained coolant stream. A passageway is provided along the axis of rotation of the adapter for receiving and conducting the coolant pressurized by the impeller assembly to a cutting tool secured in the adapter. The impeller-type coolant inducer eliminates the need for fluid seals or other friction-generating mechanical interfaces between the rotating toolholder and the source of pressurized coolant.

20 Claims, 4 Drawing Sheets

TOOLHOLDER HAVING IMPELLER-TYPE COOLANT INDUCER

BACKGROUND OF THE INVENTION

This invention generally relates to toolholders having passive coolant inducers, and is specifically concerned with a toolholder having an impeller-type coolant inducer that receives, pressurizes, and conducts an external stream of coolant to a cutting tool without the need for mechanical containment or other interfaces between the toolholder and the source of coolant.

Toolholders having coolant supply systems are well known in the prior art. Such toolholders generally comprise a rotatable toolholder body having a shank for coupling the toolholder to a rotatable drive shaft, an adapter for connecting a cutting tool such as a drill or milling head to the shank, and a coolant passageway for conducting a stream of pressurized, liquid coolant at the interface between the cutting tool and a workpiece. Because of the relative movement between the body of the toolholder and the source of pressurized coolant, the pressurized coolant is typically delivered to the toolholder by means of a conduit that is connected to one of two interfitting and relatively movable components of a coupling. The other of the two interfitting and relatively movable components is connected to the body of the toolholder. Such couplings include dynamic fluid seals between their two interfitting components to prevent unwanted leakage of the pressurized coolant during the rotation and operation of the toolholder.

While toolholders having such coolant systems have proven their ability to operate satisfactorily in many types of machining operations, the applicant has observed that a number of problems arise from the use of a dynamically sealed coupling to contain the coolant transmitted by the stationary coolant supply into the rotating body of the toolholder. For example, the seals necessary to contain the pressurized coolant in such a coupling generate significant amounts of friction during a machining operation, thereby lowering the power transmission efficiency between the drive shaft and the cutting tool. This problem has become highly exacerbated by the current and growing demand for high speed machining operations, wherein the toolholder is rotated at substantially higher rpms. Frictional forces increase exponentially with speed. Hence, the doubling or trebling of the rotational speed of the toolholder can increase the frictional forces between the fluid seals by factors between four and nine. Such greatly increased frictional forces not only interfere with power transmission, but greatly accelerate the wear on the fluid seals, thereby necessitating more frequent replacement, which in turn translates into a larger amount of expensive downtime for the tool. Moreover, the fluid-tight couplings used in conventional coolant-supplied toolholders are expensive components which must be manufactured in accordance with relatively tight tolerances. Finally, the installation of the conduits, and the rigid connections between the coolant carrying conduits and the fluid-tight couplings all necessitated by the need for mechanical containment seriously impairs the overall flexibility of the tooling system, as the coolant "plumbing" must be disconnected and reconnected every time a replacement toolholder is connected to the drive shaft.

While the applicant is aware of an alternative coolant system disclosed in U.S. Pat. No. 5,183,363 which eliminates the need for dynamic seals per se, such a system still requires the provision of a stationary, annular member that is closely spaced around the periphery of the tool spindle (i.e., about $5/1000$ of an inch) in order to effectively distribute a supply of coolant around the periphery of the spindle where it can ultimately flow into one end of a helical passageway present in the spindle body. Hence, while such an alternative design can eliminate the friction associated with dynamic sealing components used in more conventional coolant-supplied toolholders, the need for stationary, closely fitting coupling members is still present, along with the aforementioned lack of flexibility associated with the connection and disconnection of a rigid coolant plumbing system every time the toolholder is changed.

Clearly, there is a need for a toolholder having a coolant supply that not only obviates the need for sealing components, but any mechanical containment whatever in the interface between the stationary coolant supply and the rotating body of the toolholder. Preferably, such a design should be easy and inexpensive to manufacture, and readily applicable to a variety of tool-mounting adapters. Finally, the coolant system associated with such a toolholder should not require the time-consuming connection and disconnection of cumbersome coolant plumbing systems to the body of the toolholder whenever the toolholder is installed or replaced.

SUMMARY OF THE INVENTION

Generally speaking, the invention is a toolholder having an impeller-type coolant inducer that overcomes all the aforementioned shortcomings associated with the prior art. The toolholder comprises a shank that is detachably connected to a rotatable drive shaft, a tool adapter such as a collet chuck for connecting a rotatable cutting tool to the shank, and a coolant inducer mounted within the toolholder that includes an impeller assembly for receiving an uncontained stream of coolant. To this end, the impeller assembly has at least one opening on its periphery, and at least one blade for impinging upon and pressurizing the coolant received through the opening toward the center of the impeller assembly. The coolant inducer further includes a passageway in the adapter that is aligned with the axis of rotation of the toolholder for receiving the coolant pressurized by the impeller assembly and conducting it to a cutting tool, where it can be used to cool and lubricate the interface between the edge of the tool and the workpiece. The ability of the impeller assembly of the coolant inducer to receive an uncontained stream of coolant advantageously eliminates all need for containment between the stationary source of coolant, and the rotating components of the toolholder. Hence, all friction at this interface is effectively eliminated and there is no need for the machining and installation of stationary coupling members, seals, or closely-fitting components which not only add to the expense of the device, but also interfere with its ability to be easily installed or removed from a drive shaft in a machine shop.

In the preferred embodiment, the impeller assembly is mounted between the shank and the tool adapter, and includes a disc-shaped annular retainer. The annular retainer includes a circular sidewall having a plurality of uniformly spaced openings for receiving coolant and a plurality of impeller blades. The outer ends of the impeller blades abut the inner surface of the circular wall between the openings therein. The inner ends of the impeller blades terminate around a coolant guide member that is aligned with the axially-oriented passageway in the tool adapter. The impeller blades are concave so that they pressurize and guide liquid coolant toward the coolant guide when the toolholder rotates.

Both the shank and the adapter may include an annular shoulder concentrically disposed around the axis of rotation of the toolholder, and the annular retainer may include upper and lower annular walls which terminate in circular edges for receiving an annular shoulder of the shank and adapter. The inner edges of the upper and lower walls of the annular retainer are concentrically arranged around the axis of rotation of the toolholder so that when these three components are thus assembled, the axes of rotation of the shank, the adapter, and the impeller assembly are all colinear.

In operation, an uncontained stream of pressurized coolant is directed at the peripheral openings of the impeller assembly along a line which is chordally oriented with respect to the disc-shaped impeller assembly. The concavity of the impeller blades causes them to apply a radially directed pressure on the liquid coolant impinging on the blades through the impeller openings, which in turn forces the coolant through the centrally disposed coolant guide member circumscribing the inner ends of the impeller blades, and from thence through the passageway in the tool adapter. The pressure thus generated by the rotating impeller blades is always greater than the counter-pressure applied to the liquid coolant as a result of centrifugal forces from the rotation of the impeller assembly. Hence, the impeller assembly effectively pumps coolant to the rotating cutting tool attached to the adapter even at very high rotational speeds.

BRIEF DESCRIPTION OF THE SEVERAL FIGURES

DETAILED DESCRIPTION OF THE PREFERRED EMBODIMENT

Figure 1:
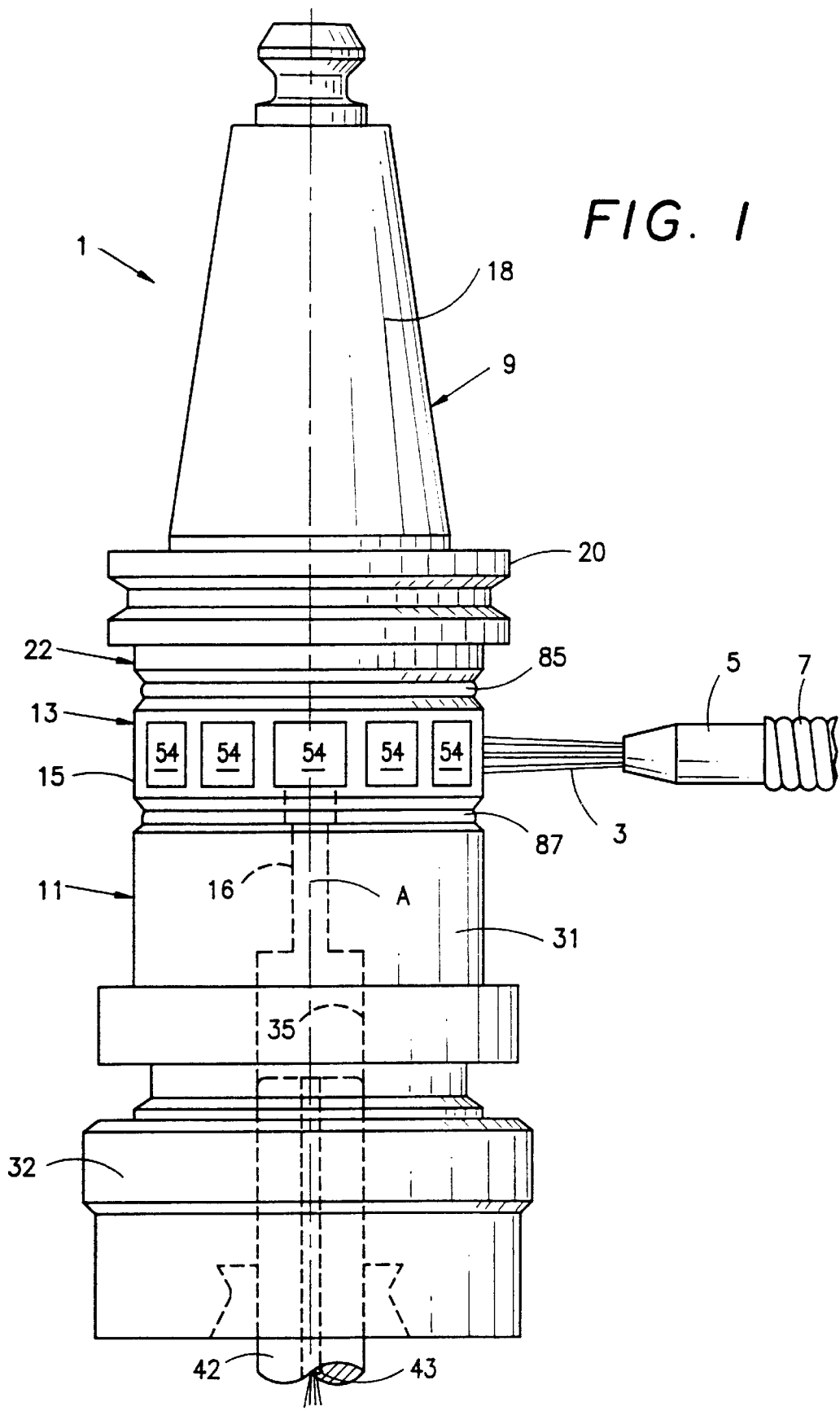
FIG. 1 is a side view of a toolholder of the invention having an impeller-type coolant inducer, illustrating how the openings in the impeller assembly receive an uncontained stream of coolant.
Figure 2:
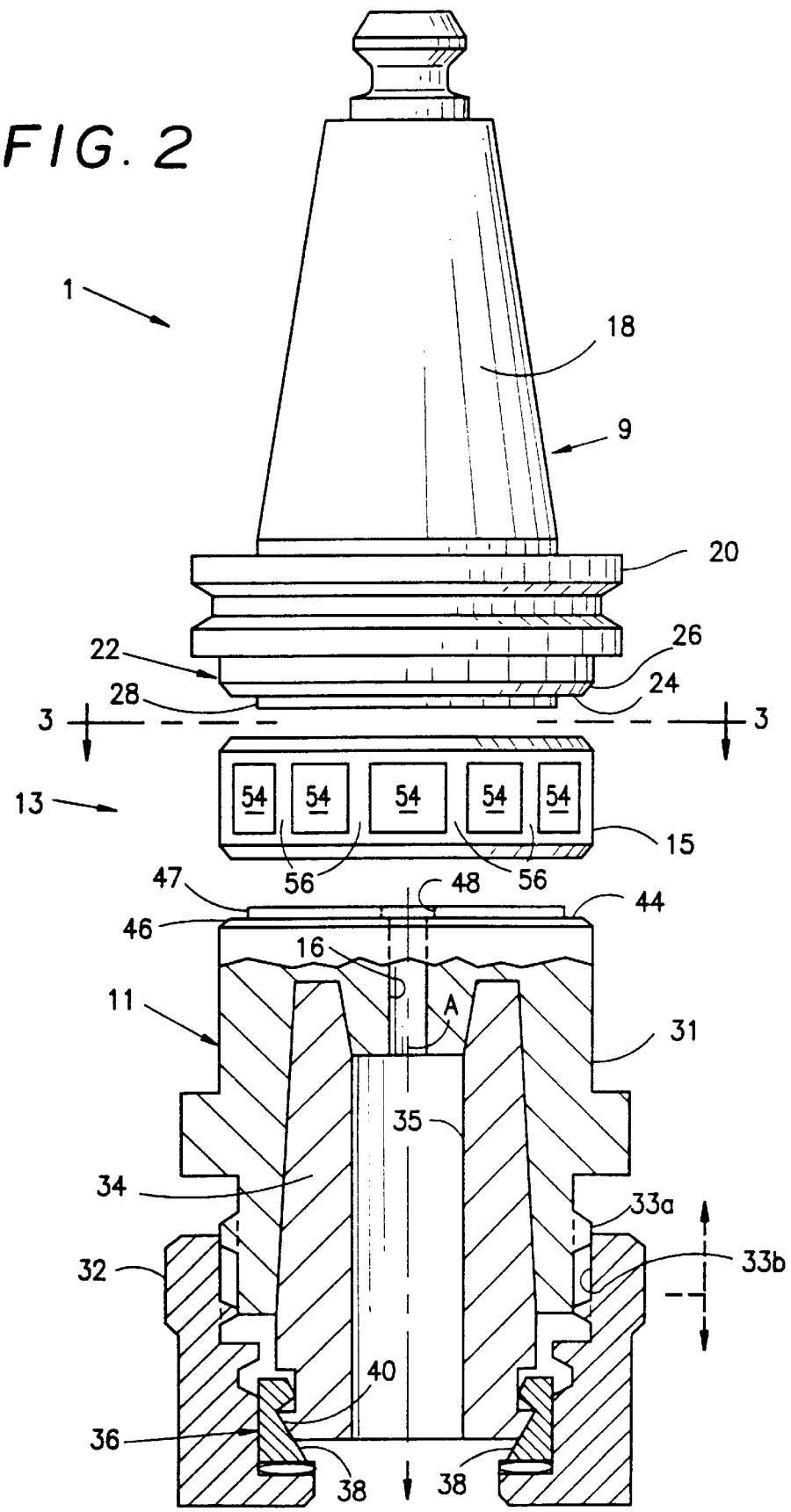
FIG. 2 is an exploded partial cross-sectional view of the toolholder illustrated in FIG. 1, illustrating how the shank and adapter are assembled onto the annular retainer of the impeller assembly.

With reference now to FIGS. 1 and 2, wherein like numbers designate like components throughout all the several figures, the toolholder of the invention 1 can advantageously receive an uncontained stream 3 of coolant without the need for any type of closely-fitting parts between the stream 3 and the rotatable holder 1. Such an uncontained stream 3 of coolant may be discharged from a nozzle 5 that is preferably mounted onto a flexible hose 7 for facilitating the easy and rapid positioning of the nozzle 5 with respect to the coolant inducer of the toolholder 1. Although not shown in any of the several figures, the flexible hose 7 is ultimately connected to a source of pressurized coolant capable of continuously generating the stream 3 during the operation of the holder 1.

The toolholder 1 generally comprises a shank 9 for detachably connecting the holder 1 to a drive shaft (not shown), an adapter 11 for gripping a cutting tool, and a coolant inducer 13. The principal components of the coolant inducer 13 are an impeller assembly 15 connected between the lower end of the shank 9 and the upper end of the adapter 11, and a fluid passageway 16 in the adapter 11 that is aligned with the axis of rotation A of the holder 1.

The shank 9 includes a tapered, frusto-conical portion 18 that terminates, at its bottom end, in an annular flange 20. The frusto-conical portion 18 is rigidly mountable in a complementarily shaped conical recess of a drive shaft. Projecting below the annular flange 20 of the shank 9 is a cylindrical coupling portion 22 which facilitates the alignment and assembly of the shank 9 with the coolant inducer 13. To this end, the coupling portion 22 includes a bottom circular wall 24 (shown in FIG. 2). The circular wall 24 is circumscribed around its outer periphery by an annular bevel 26, and around its inner periphery by an annular shoulder 28. The alignment function of the annular shoulder 28 will be described in more detail hereinafter.

The adapter 11 in the embodiment of the invention 1 illustrated in FIGS. 1 and 2 is a collet-type chuck having a cylindrical chuck body 31. At its lower end, the chuck body 31 is circumscribed by a locknut 32. Both the body 31 and locknut 32 are connected by way of screw threads 33$a,b$, respectively. A tapered collet 34 is disposed within a recess in the interior of the chuck body 31 of like shape. While not specifically shown in any of the several figures, the collet 34 is formed from a plurality of resilient finger elements separated by longitudinal slots that allow its inner surface 35 to radially contract around and grip the shaft of a rotatable cutting tool when the locknut 32 is tightened. The gripping action of the collet 34 is controlled by a nose ring 36 which is mounted within the locknut 34. Nose ring 36 has angular cam surfaces 38 that engage angular follower surfaces 40 of the collet end in order to flex the resilient fingers forming the collet 34 inwardly. Such an inward flexing of the collet fingers allows the collet 34 to grip the shaft 42 of a rotatable cutting tool having a bore 43 for conducting coolant to the interface between the cutting tool and a workpiece (not shown). At its upper end, the chuck body 31 has an upper circular wall 44 circumscribed around its outer periphery by annular bevel 46, and around its inner periphery by annular shoulder 47. The function of the annular shoulder 47 in aligning the adapter 11 to the impeller assembly 15 will be explained in more detail hereinafter.

Figures 3, 4:
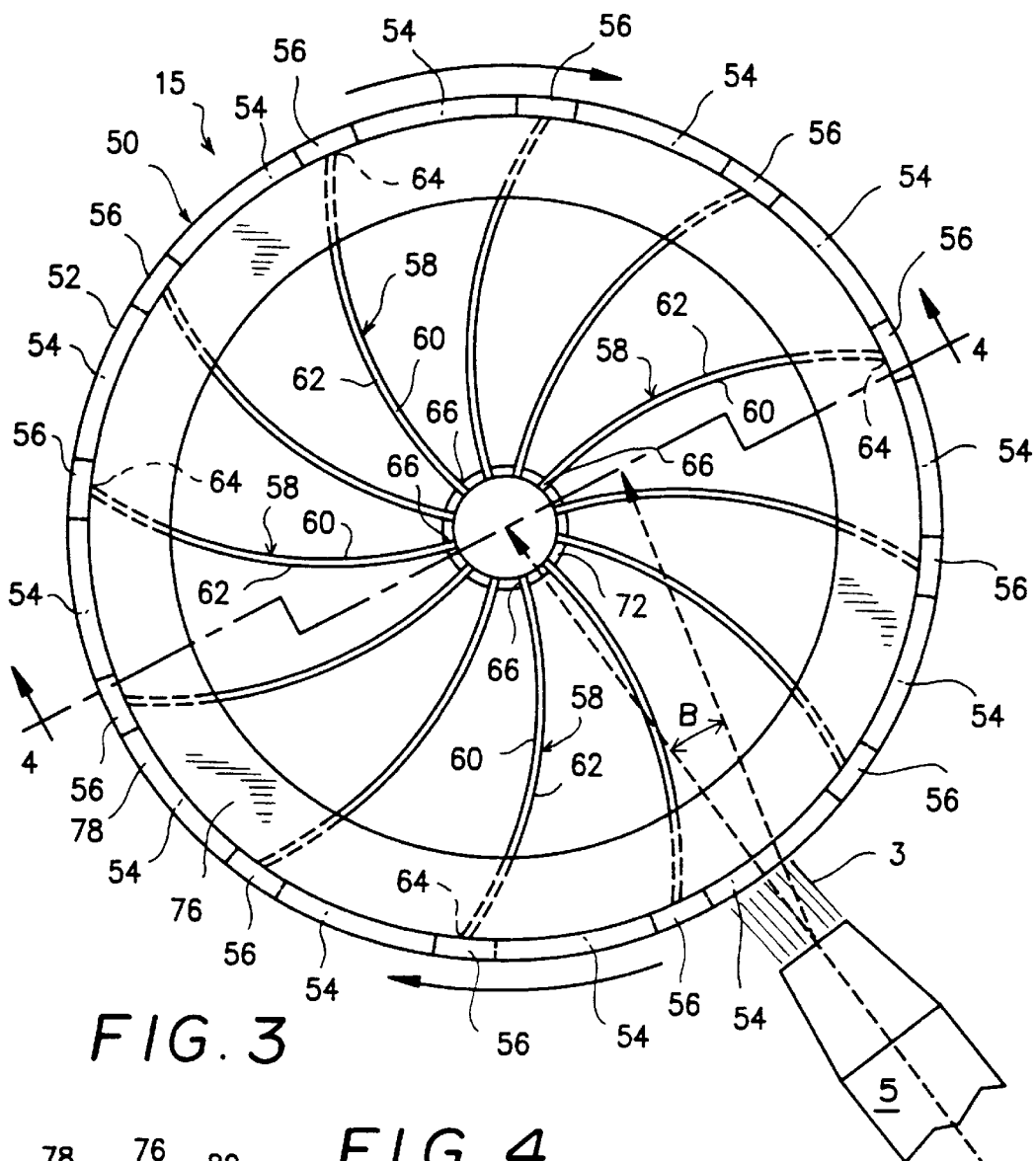
FIG. 3 is a plan view of the impeller assembly along the line 3—3 in FIG. 2.
FIG. 4 is a cross-sectional side view of the impeller assembly illustrated in FIG. 3 along the line 4—4.

With reference now to FIGS. 3 and 4, the impeller assembly 15 of the coolant inducer 13 is generally formed from an annular retainer 50, and a plurality of impeller blades 58. The annular retainer 50 includes a circular sidewall 52 having a plurality of uniformly spaced, coolant-receiving openings or windows 54. The preferred embodiment 1 includes twelve such windows 54 as shown. Each of the windows 54 is defined on either of its sides by axially oriented framing sections 56. In the preferred embodiment, the peripheral extent of each window 54 is at least three times the peripheral extent of each framing section 56. Such proportioning insures that the uncontained stream 3 of coolant will be injected into the impeller assembly 15 about 75% of the time as the assembly 15 rotates, thereby minimizing the extent to which coolant is wasted by merely bouncing off the framing sections 56 of the circular sidewall 52.

Each of the twelve impeller blades 58 includes both a concave inner surface 60, and a convex outer surface 62. In operation, the concave inner surface 60 of each blade 58 impinges, guides, and pressurizes coolant entering the windows 54 from the uncontained stream 3. The outer ends of the each of the impeller blades 58 abut and are sealingly connected to the inner surface of one of the axially oriented framing sections 56, while the inner ends 66 of the blades 58 converge into an annular coolant guide member 72.

The annular retainer 50 further includes a lower annular wall 68 which is circumscribed on its outer periphery by lower bevel 70. The bottom edge 74 of each of the impeller blades 58 is connected to the inner surface of the lower annular wall 68 and the coolant guide member 72. Additionally, the inner periphery of the lower annular wall 68 defines an inner annular edge 75 which concentrically fits around the previously described annular shoulder 47 of the adapter 11 in order to align the axis of rotation of the impeller assembly 15 with the axis of rotation of the adapter 11.

The annular retainer 50 also has an upper annular wall 76. Like previously described wall 68, wall 76 is circumscribed around its outer periphery by upper bevel 78, and around its inner pheriphery by an inner annular edge 82. The upper edge 80 of each of the impeller blades 58 engages the lower surface of the upper annular wall 76 as shown. Additionally, the inner annular edge 82 of wall 76 concentrically receives the annular shoulder 28 of the cylindrical coupling portion 22 of shank 9 in order to align the axis of rotation of the impeller assembly 15 with the axis of rotation of the shank 9. When the shank 9, impeller assembly 15, and adapter 11 are interfitted in the position indicated in phantom in FIG. 4, these three components are preferably interconnected by means of upper and lower weld beads 85,87 illustrated in FIG. 1. Weld beads 85,87 fill in the bevel portions 26,78 of the shank 9 and impeller assembly 15 and the bevel portions 46,70 of the adapter 11 and impeller assembly 15, respectively.

The operation of the toolholder 1 of the invention may best be understood with respect to FIGS. 1 and 3. Prior to the rotation of the tool 1, the position of the nozzle 5 that directs the stream of coolant 3 is adjusted via flexible hose 7 so that the coolant stream 3 is directed in a chordal orientation into the windows 54 of the impeller assembly 15. As may best be appreciated in FIG. 3, the chordal orientation of the nozzle 5 is almost, but not quite radial with respect to the center point of the annular coolant guide member 72. The narrow angle B that the nozzle 5 is turned away from a true radial orientation promotes the pressurizing operation of the impeller blades 58 as the impeller assembly 15 is rotated in a clockwise direction, as is indicated by the directional arrows. A mirror image impeller that is rotated in a counterclockwise direction is used for tooling of the opposite hand. The involute shape of the concave inner surfaces 60 of the impeller blades 58, coupled with the angle of impingement of the coolant stream 3, causes the coolant impinged by the blades 58 to be pressurized and guided toward the inner ends 66 of the blades 58. As may best be appreciated in FIG. 4, liquid coolant flowing past the inner ends 66 has nowhere else to flow but through the center of the annular coolant guide member 72, its passage being blocked by the engagement of the bottom and top edges 74,80 of each blade against the circular, upper and lower surfaces of the shank 9 and adapter 11, respectively. As may best be appreciated in FIG. 1, pressurized coolant flowing through the coolant guide member 72 is conducted by the passageway 16 into the shaft receiving inner surface 35 of the collet 34. From thence, the pressurized coolant is free to enter into and flow through a bore 43 in a tool shaft 42. It should be noted that positioning of the passageway 16 colinearly with the axis of rotation A of the adapter 11 minimizes centrifugal forces on the coolant which would otherwise generate pressures in the coolant that would draw it away from the bore 43 of a tool shaft 42 mounted in the collet 34.

Figure 5:
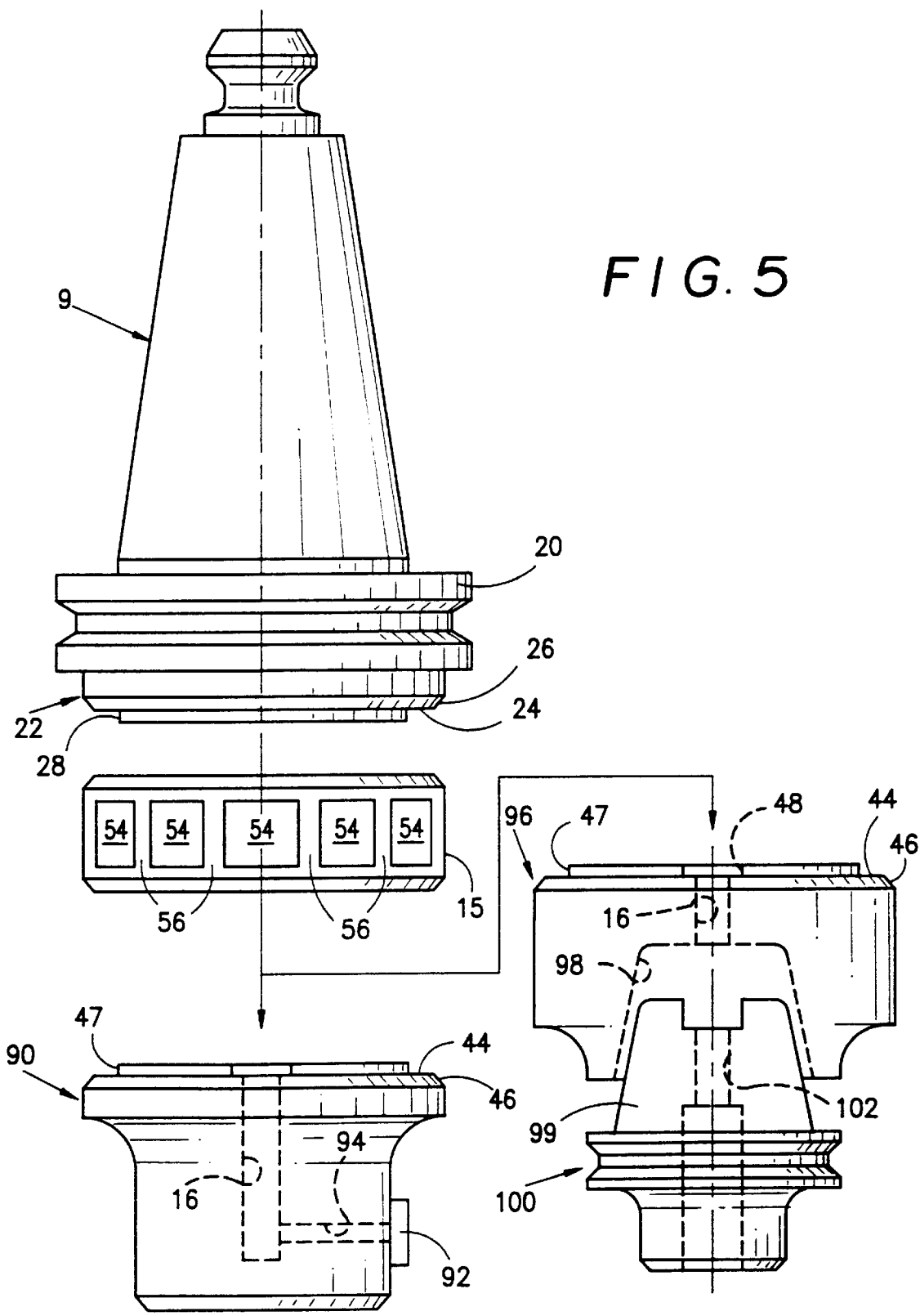
FIG. 5 is a diagrammatic side view of the toolholder of the invention, illustrating how it may be used with alternate tool adapters.

While the adapter 11 in the embodiment of the toolholder 1 illustrated in FIGS. 1 and 2 is a chuck-like collet, FIG. 5 illustrates that the adapter may assume any number of forms. For example, the adapter 90 may be a milling head 90 onto whose periphery one or more cutting inserts 92 is mounted. A lateral coolant bore 94 branches off from the main coolant conducting passageway 16 to supply pressurized coolant between the interface between the cutting edge of the insert 92, and a workpiece (not shown). The adapter 96 may also assume the form of a quick-change coupling of the type having a frusto-conical recess 98 for receiving the tapered shank 99 of a quick-release toolholder 100. In such a case, the toolholder 100 includes an axial bore 102 for conducting pressurized coolant received from the passageway 16 onto a rotatable cutting tool (not shown) attached to the toolholder 100.

While this invention has been described with respect to several preferred embodiments, different variations, modifications, and additions to this invention will become evident to persons of skill in the art. All such variations, modifications, and additions are intended to be encompassed within the scope of this invention, which is limited only by the claims appended hereto.

What is claimed is:

1. A toolholder rotatable about an axis for receiving, pressurizing, and conditioning an external stream of coolant to a rotating cutting tool without mechanical containment between said toolholder and said stream of coolant, comprising:

a shank for coupling the toolholder to a rotatable drive shaft;

adapter means for connecting a rotatable cutting tool to said shank, and a coolant inducer mounted within said toolholder including an impeller assembly having at least one opening on the periphery of the toolholder for receiving an uncontained coolant stream, and at least one blade for impinging and pressurizing coolant received from said opening, said inducer further including a passageway in said adapter means aligned with the axis of rotation for receiving pressurized coolant from the impeller assembly and conducting it to a cutting tool.

2. The toolholder as defined in claim 1, wherein said impeller assembly includes a plurality of coolant receiving openings, and a plurality of blades for pressurizing coolant received through said openings and conducting it to said passageway.

3. The toolholder as defined in claim 2, wherein said impeller assembly includes an annular retainer for retaining said impeller blades.

4. The toolholder as defined in claim 3, wherein said annular retainer is mounted between said shank and adapter means, and includes a circular sidewall, and said openings are disposed around the periphery of said circular sidewall between pairs of said plurality of impeller blades.

5. The toolholder as defined in claim 4, wherein said impeller blades each includes inner ends and outer ends, and wherein said outer ends abut said circular sidewall.

6. The toolholder as defined in claim 5, wherein said impeller assembly includes a coolant guide member that circumscribes said inner ends of said impeller blades.

7. The toolholder as defined in claim 6, wherein said coolant guide member communicates with said passageway aligned with the axis of rotation of said adapter means.

8. The toolholder as defined in claim 4, wherein each of said shank and adapter means includes an annular shoulder concentrically disposed around said axis of rotation, and wherein said annular retainer includes upper and lower annular walls, each of which terminates in a circular edge for receiving the annular shoulder of said shank and adapter means, respectively, to concentrically align said shank, adapter means and coolant inducer around said axis of rotation.

9. The toolholder as defined in claim 1, wherein said impeller blade has a concave side for collecting coolant received through said opening and pressurizing said collected coolant toward said passageway.

10. The toolholder as defined in claim 1, wherein said adapter means is one of the group consisting of a collet chuck, an end mill, and a quick-release coupling.

11. A rotatable toolholder for receiving, pressurizing and conducting an external stream of coolant to a rotating cutting tool without mechanical containment between said toolholder and said stream of coolant, comprising:

a shank for coupling the toolholder to a rotatable drive shaft;

adapter means having an axis of rotation for connecting a rotatable cutting tool to said shank, and a coolant inducer including an impeller assembly mounted between said shank and said adapter means having a plurality of openings around its periphery for receiving an uncontained coolant stream, and a plurality of blades for impinging and pressurizing coolant received through said openings, said inducer further including a passageway in said adapter means aligned with the axis of rotation for receiving pressurized coolant from said impeller assembly and conducting it to a cutting tool mounted in said adapter means.

12. The toolholder as defined in claim 11, wherein said impeller assembly includes an annular retainer for retaining said impeller blades, wherein said annular retainer is mounted between said shank and adapter means, and includes a circular sidewall, and openings are disposed around the periphery of said circular sidewall between pairs of said plurality of impeller blades.

13. The toolholder as defined in claim 12, wherein said impeller blades each includes inner ends and outer ends, and wherein said outer ends abut said circular sidewall.

14. The toolholder as defined in claim 13, wherein said impeller assembly includes a coolant guide member that circumscribes said inner ends of said impeller blades.

15. The toolholder of claim 14, wherein said coolant guide member is concentrically aligned with said coolant passageway in said adapter means.

16. The toolholder as defined in claim 12, wherein each of said shank and adapter means includes an annular shoulder concentrically disposed around said axis of rotation, and wherein said annular retainer includes upper and lower annular walls, each of which terminates in a circular edge for receiving the annular shoulder of said shank and adapter means, respectively, to concentrically align said shank, adapter means and coolant inducer around said axis of rotation.

17. The toolholder of claim 14, wherein said outer ends of said impeller blades are sealingly connected to the inner surface of said circular sidewall of said annular retainer.

18. The toolholder as defined in claim 11, wherein said adapter means is one of the group consisting of a collet chuck, an end mill, and a quick-release coupling.

19. The toolholder as defined in claim 11, wherein said impeller blade has a concave side for collecting coolant received through said opening and pressurizing said collected coolant toward said passageway.

20. A method of delivering coolant to a rotating cutting tool without mechanical containment between a stream of coolant and a rotatable toolholder that includes a shank for coupling the toolholder to a rotatable drive shaft; adapter means for connecting a rotatable cutting tool to said shank, and a coolant inducer mounted within said toolholder including an impeller assembly having at least one opening on the periphery of the toolholder for receiving an uncontained coolant stream, and at least one blade for impinging and pressurizing coolant received from said opening, said inducer further including a passageway in said adapter means aligned with the axis of rotation for receiving pressurized coolant from the impeller assembly and conducting it to a cutting tool, comprising the steps of rotating the toolholder, and directing a stationary, uncontained stream of coolant onto a peripheral location on said toolholder that includes said impeller assembly opening.

* * * * *